(12) United States Patent
Febonio et al.

(10) Patent No.: US 8,539,335 B2
(45) Date of Patent: Sep. 17, 2013

(54) ENTERING DATA INTO A WEBPAGE

(75) Inventors: Barbara Febonio, Rome (IT); Sandro Piccinini, Rome (IT)

(73) Assignee: International Business Machines Corporation, Armonk, NY (US)

( * ) Notice: Subject to any disclaimer, the term of this patent is extended or adjusted under 35 U.S.C. 154(b) by 839 days.

(21) Appl. No.: 12/270,344

(22) Filed: Nov. 13, 2008

(65) Prior Publication Data

US 2009/0150762 A1 Jun. 11, 2009

(30) Foreign Application Priority Data

Dec. 10, 2007 (EP) .................................... 07122715

(51) Int. Cl.
G06F 17/00 (2006.01)

(52) U.S. Cl.
USPC ........................... 715/226; 715/221; 715/224

(58) Field of Classification Search
USPC .............................. 715/226; 726/8; 702/127
See application file for complete search history.

(56) References Cited

U.S. PATENT DOCUMENTS

| | | | | |
|---|---|---|---|---|
| 6,307,471 B1 * | 10/2001 | Xydis | ......................... | 340/568.1 |
| 6,456,958 B1 * | 9/2002 | Xydis | ......................... | 702/158 |
| 6,763,315 B2 * | 7/2004 | Xydis | ......................... | 702/127 |
| 7,490,242 B2 * | 2/2009 | Torres et al. | ................... | 713/182 |
| 7,589,614 B2 * | 9/2009 | Xydis | ......................... | 340/5.61 |
| 7,660,779 B2 * | 2/2010 | Goodman et al. | ............... | 706/48 |
| 7,812,860 B2 * | 10/2010 | King et al. | ................ | 348/210.99 |
| 2002/0065625 A1 * | 5/2002 | Xydis | ......................... | 702/127 |
| 2002/0069030 A1 * | 6/2002 | Xydis | ......................... | 702/176 |
| 2002/0104012 A1 * | 8/2002 | Xydis | ......................... | 713/200 |
| 2002/0147912 A1 | 10/2002 | Shmueli et al. | | |
| 2004/0205357 A1 | 10/2004 | Kuo et al. | | |
| 2005/0044424 A1 * | 2/2005 | Xydis | ......................... | 713/201 |
| 2005/0053217 A1 | 3/2005 | Reformato et al. | | |
| 2005/0282584 A1 | 12/2005 | Faisy | | |
| 2006/0098899 A1 * | 5/2006 | King et al. | ..................... | 382/305 |
| 2006/0179404 A1 | 8/2006 | Yolleck et al. | | |

FOREIGN PATENT DOCUMENTS

| | | |
|---|---|---|
| EP | 1021020 A | 7/2000 |
| EP | 1146692 A | 10/2001 |
| EP | 1777629 A1 | 4/2007 |
| JP | 02530772 A | 9/2002 |
| JP | 2003012063 A | 4/2003 |
| JP | 2007241749 A | 9/2007 |
| JP | 2007300435 A | 11/2007 |
| JP | 2007306057 A | 11/2007 |
| WO | WO 9804976 A1 | 2/1998 |
| WO | 2006135542 A2 | 12/2006 |
| WO | 2006136752 A2 | 12/2006 |

OTHER PUBLICATIONS

Ensure Technologies available at http://ensuretech.com/ as of Jun. 20, 2007.*

(Continued)

*Primary Examiner* — William Bashore
*Assistant Examiner* — Nathan Shrewsbury
(74) *Attorney, Agent, or Firm* — D'Ambrosio & Menon, PLLC

(57) ABSTRACT

Methods, systems, and computer program products for entering data into a web page by means of a data processing system. The method includes detecting a wireless device and forming a communication link between the data processing system and the wireless device. The method also includes retrieving data from the wireless device. The method also includes populating fields in the web-page with the retrieved data.

9 Claims, 2 Drawing Sheets

(56) References Cited

OTHER PUBLICATIONS

Dekart Password Manager and Form Filler http://www.dekart.com/products/access_control/password_manager/ (Deckart).*

Seagate Mobile Bluetooth storage as described at http://www.trustedreviews.com/news/Seagate-Offers-Mobile-Bluetooth-Storage. (Seagate).*

Roboform Form Filler http://web.archive.org/web/20080719015728/http://www.roboform.com/manual-pr.html.*

Written Opinion, International Searching Authority.

JPO Office Action dated May 7, 2013 for co-pending Japanese Patent App. No. 2010-536932.

* cited by examiner

ENTERING DATA INTO A WEBPAGE

PRIORITY

This application is based on and claims the benefit of priority from European Patent Application No. EP07122715, filed Dec. 10, 2007.

BACKGROUND

A number of Internet pages require fields to be completed providing, for example, a user name and password to access a service. On encountering such information, a user has a number of choices. The user could enable the browser to remember choices that will be prompted to the user when filling similar fields again. The user could manually enter the information every time it is required. The user could also employ products that are designed for filling out forms.

The 'remember fields' option of form-filling products has clear security risks. Furthermore, these products reside on the computer that is actually used to surf the Internet which introduces another security risk. Similarly, while the manual entry approach is the most secure and reliable way of filling in required information, it is often frustrating and time-consuming.

SUMMARY

Methods, systems, and computer program products are disclosed for entering data into a web page by means of a data processing system. One embodiment is a method including detecting a wireless device and forming a communication link between the data processing system and the wireless device. The method also includes retrieving data from the wireless device. The method also includes populating fields in the web-page with the retrieved data.

One embodiment is a computer program product disposed on a computer-readable medium for entering data into a web page by means of a data processing system. The computer program product includes computer program instructions for detecting a wireless device. The computer program product also includes computer program instructions for forming a communication link between the data processing system and the wireless device. The computer program product also includes computer program instructions for retrieving data from the wireless device. The computer program product also includes computer program instructions for populating fields in the web-page with the retrieved data.

One embodiment is a data processing system for entering data into a web page. The data processing system includes a processor and a computer memory operatively coupled to the processor. The computer memory has disposed within it computer program instructions for detecting a wireless device. The computer memory also has disposed within it computer program instructions for forming a communication link between the data processing system and the wireless device. The computer memory also has disposed within it computer program instructions for retrieving data from the wireless device. The computer memory also has disposed within it computer program instructions for populating fields in the web-page with the retrieved data.

The foregoing and other objects, features and advantages of the disclosure will be apparent from the following more particular descriptions of exemplary embodiments of the invention as illustrated in the accompanying drawings wherein like reference numbers generally represent like parts of exemplary embodiments of the invention.

DETAILED DESCRIPTION

Aspects of the invention enable a user to interact with forms or authentication pages in a simple and immediate way. Aspects of the invention move a storing field feature from a shared browser to a personal system, thereby enhancing the privacy and the security of information.

Embodiments disclosed herein allow a user to fill out forms without manual intervention. Aspects of the invention can be used at a public Internet access point, such as an Internet café, without the risk of leaving stored personal information therein.

The system is based on the leveraging of a device capable of utilizing the Bluetooth (Trademark) communication protocol, from which information can be retrieved, to fill in data over the Internet, through a browser plug-in. More particularly, the embodiment establishes a secure connection with the external device and provides information on demand to the browser. A browser plug-in may be configured to accept authentication by a single sign-on, or optionally configured to request authentication for each URL.

The use of Bluetooth-capable device allows the "filling-in" of a form when connection to an external server or database is not allowed (e.g. firewall, only use of intranet allowed, network problems etc). The local retrieving system allows the user to be aware of the usage of his personal information. In contrast, information held on a server can be read by anyone with authorized (or unauthorized) access the server. Similarly, data retrieval can be configured for each URL with a different level of security (e.g. for some URLs a Bluetooth (Trademark) PIN is required and for other URLs a PIN is not required). Finally, the Bluetooth (Trademark) device can produce a log of data usage which can be easily accessed without any additional connection or applications. Alternatively, other forms of wireless connection could be used (e.g. employing, at least partially, RFID tags).

Figure 1:
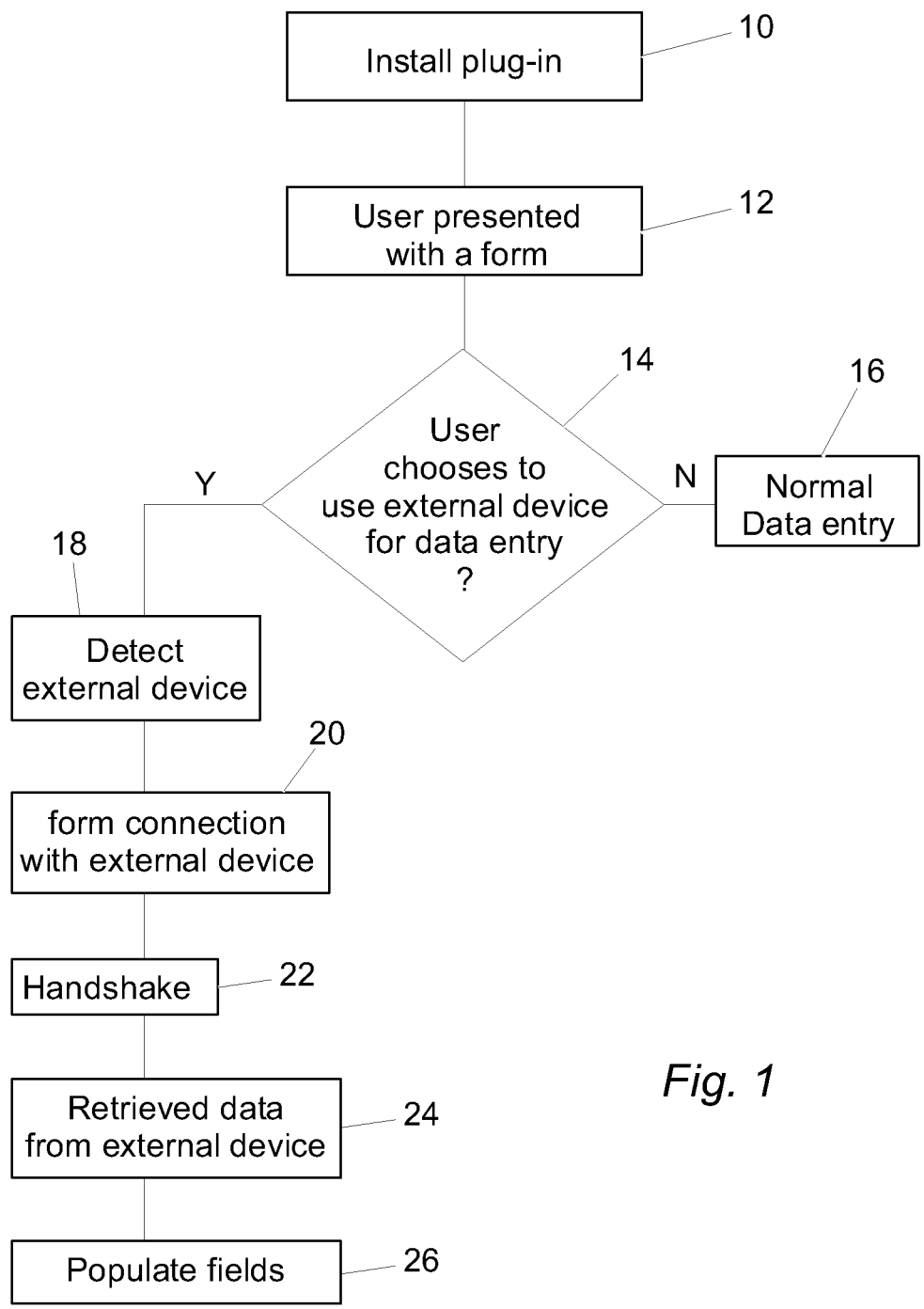
FIG. 1 is a flow chart illustrating a method for entering data into a web page by means of a data processing system according to one embodiment of the present disclosure.

Referring to FIG. 1, the embodiment is based on a plug-in that can be installed 10 on top of a conventional Internet browser. The plug-in enables the browser to communicate with an external device (e.g. phone, palm top or other computer) connected through, for example, a Bluetooth (Trademark) connection or a USB connection. In operation, a user surfing over the Internet is presented 12 with a form. The user is allowed to choose 14 whether or not to use an external device for data retrieval and entry into the form. Should the user choose not to use the external device, the user may enter 16 the data in accordance with their normal practice. However, should the user choose to use the external device for data entry, the plug-in detects 18 the presence or proximity of the user's external device. For example, the browser can simply check for the presence of any nearby devices. Alternatively, the browser may be configured to look for a specific device (identified, for example, by an IMEI code).

Having detected the external device, the browser is allowed to form 20 a tentative connection with the external device.

The user may configure the browser to require a handshaking operation before the connection is completed. In this case, after forming the initial tentative connection, the external device will require a password from the user to allow the handshaking 22 operation. Once the connection is established between the browser and the external device, each time the browser presents the user with fields to be completed, the user can invoke a toolbar command to retrieve 24 the appropriate information from the external device and use the retrieved information to populate 26 the appropriate fields of the form.

In order to increase the security of the data-entry operation, the user may configure the plug-in to require confirmation from the user for each data retrieval operation. The connection between the external device and the browser can be interrupted at any time by moving the external device out of range of the computer comprising the relevant browser. Alternatively, the connection can be manually terminated by the user.

Figure 2:
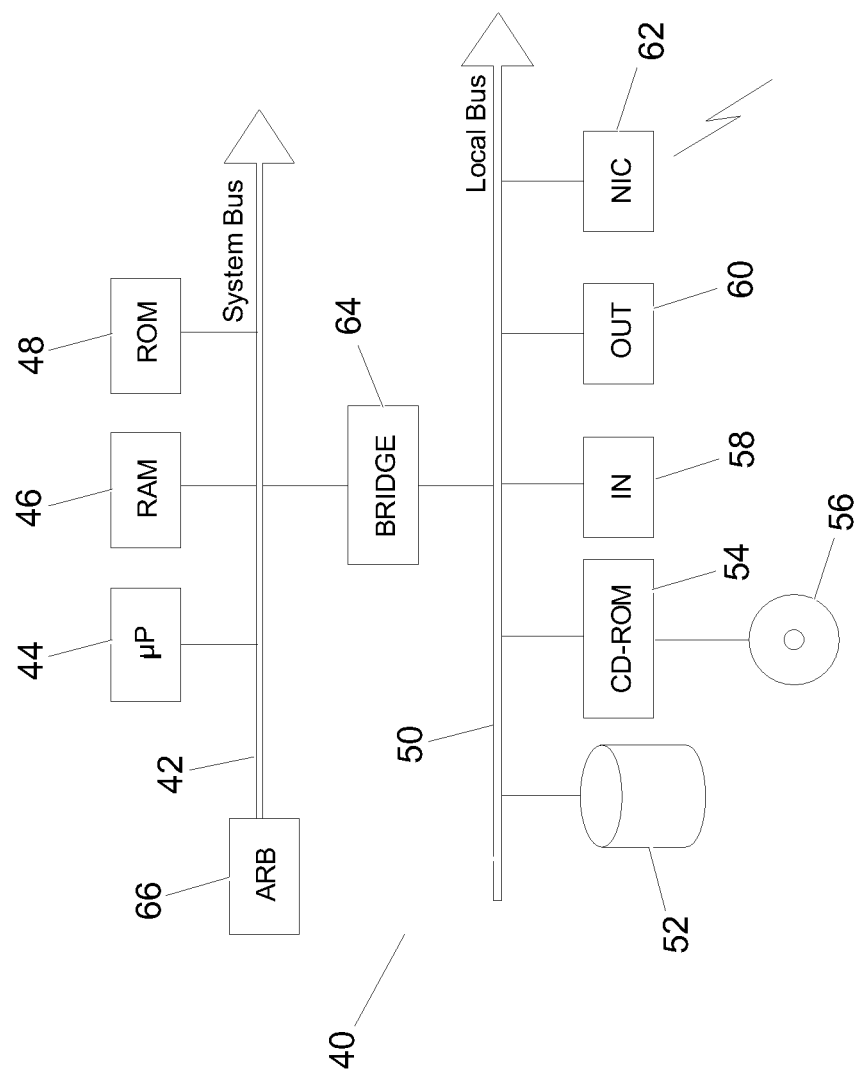
FIG. 2 is a block diagram illustrating a system for entering data into a web page by means of a data processing system according to one embodiment of the present disclosure.

FIG. 2 is a block diagram illustrating a data processing system for entering data into a web page by means of a data processing system according to one embodiment of the present disclosure. A computer of the system is denoted with 40. The computer 40 is formed by several units that are connected in parallel to a system bus 42. In detail, one or more microprocessors 44 control operation of the computer 40; a RAM 46 is directly used as a working memory by the microprocessors 44, and a ROM 48 stores basic code for a bootstrap of the computer 40. Peripheral units are clustered around a local bus 50 (through respective interfaces). A mass memory consists of a hard-disk 52 and a drive 54 for reading CD-ROMs 56. The computer 40 includes input devices 58 (for example, a keyboard and a mouse), and output devices 60 (for example, a monitor and a printer). A Network Interface Card (NIC) 62 is used to connect the computer 40 to the network. A bridge unit 64 interfaces the system bus 42 with the local bus 50. Each microprocessor 44 and the bridge unit 64 can operate as master agents requesting an access to the system bus 42 for transmitting information. An arbiter 66 manages the granting of the access with mutual exclusion to the system bus 42.

The computer implemented method described above may be implemented as a computer program product including computer program instructions disposed within a computer-readable medium. Computer 40 may implement the method described above with reference to FIG. 1 by executing the computer program instructions. Program products and data may be stored on the hard-disk 52 and at least partially loaded into the working memory of the computer when the programs are running. The programs may be initially installed onto the hard disk, for example, from CD-ROM.

Software used to implement embodiments of the invention may be structured in various ways and may include modules or functions. Aspects of the invention may be implemented in any form suitable to be used by or in connection with any data processing system. Moreover, the program may be provided on any computer-readable medium; the medium can be any element suitable to contain, store, communicate, propagate, or transfer the program. Examples of such medium are fixed disks (where the program can be pre-loaded), removable disks, tapes, cards, wires, fibers, wireless connections, networks, broadcast waves, and the like; for example, the medium may be of the electronic, magnetic, optical, electromagnetic, infrared, or semiconductor type.

It should be understood that the inventive concepts disclosed herein are capable of many modifications. To the extent such modifications fall within the scope of the appended claims and their equivalents, they are intended to be covered by this patent.

What is claimed is:

1. A computer-implemented method for entering data into one or more data fields forming part of one or more web pages using a data processing system, the method comprising:
   determining whether a user of a wireless device has selected the wireless device for data retrieval;
   detecting a proximity of a wireless device responsive to a determination that the user has selected the wireless device for data retrieval, wherein detecting the proximity of the wireless device comprises searching for a specified wireless device, and further wherein searching for the specified wireless device comprises searching for a device identified by a specific IMEI code;
   establishing a tentative connection between the data processing system and the wireless device responsive to the detection of the proximity of the wireless device;
   initiating a handshaking operation by prompting the user of the wireless device to input a password for authentication;
   establishing a communication link between the data processing system and the wireless device responsive to a determination that the user is an authenticated user based on the password inputted by the user, wherein establishing the communication link comprises establishing the communication link through a Bluetooth protocol; and
   performing one or more data retrieval operations, each data retrieval operation comprising:
      retrieving data from the wireless device,
      populating one or more fields in a web-page with the retrieved data, wherein each data retrieval operation corresponds to a different web page and the user of the wireless device is provided with a capability to configure the data processing system to require confirmation for each data retrieval operation.

2. The method of claim 1 wherein establishing the communication link comprises establishing the communication link through a USB connection.

3. A computer program product comprising a non-transitory computer-readable medium having computer program instructions disposed therein for entering data into one or more fields forming part of one or more web pages using a data processing system, the computer program instructions comprising:
   computer program instructions for determining whether a user of a wireless device has selected the wireless device for data retrieval;
   computer program instructions for detecting a proximity of a wireless device responsive to a determination that the user has selected the wireless device for data retrieval, wherein computer program instructions for detecting the proximity of the wireless device comprise computer program instructions for searching for a specified wireless device, and further wherein computer program instructions for searching for the specified wirless device comprise computer program instructions for searching for a device identified by a specific IMEI code;
   computer program instructions for establishing a tentative connection between the data processing system and the wireless device responsive to the detection of the proximity of the wireless device;
   computer program instructions for initiating a handshaking operation by prompting the user of the wireless device to input a password for authentication;

computer program instructions for establishing a communication link between the data processing system and the wireless device responsive to a determination that the user is an authenticated user based on the password inputted by the user, wherein computer program instructions for establishing the commucication link comprise computer program instructions for establishing the communication link through a Bluetooth protocol; and computer program instructions for performing one or more data retrieval operations, the computer program instructions for performing each data retrieval operation comprising:

computer program instructions for retrieving data from the wireless device, computer program instructions for populating one or more fields in a web-page with the retrieved data, and computer program instructions for providing the user of the wireless device with a capability to configure the data processing system to require confirmation for each data retrieval operation, wherein each data retrieval operation corresponds to a different web page.

4. The computer program product of claim 3 wherein computer program instructions for establishing the communication link comprise computer program instructions for establishing the communication link through a USB connection.

5. A data processing system for entering data into one or more fields forming part of one or more web pages, the system comprising:

a processor; and a computer memory operatively coupled to the processor; the computer memory having disposed therein:

computer program instructions for determining whether a user of a wireless device has selected the wireless device for data retrieval;

computer program instructions for detecting the proximity of the wireless device responsive to a determination that the user has selected the wireless device for data retrieval, wherein computer program instructions for detecting the proximity of the wireless device comprise computer program instructions for searching for a specified wireless device, and further wherein computer program instructions for searching for the specified wireless device comprise computer program instruction for searching for a device identified by a specific IMEI code;

computer program instructions for establishing a tentative connection between the data processing system and the wireless device responsive to the detection of the proximity of the wireless device;

computer program instructions for initiating a handshaking operation by prompting the user of the wireless device to input a password for authentication;

computer program instructions for establishing a communication link between the data processing system and the wireless device responsive to a determination that the user is an authenticated user based on the password inputted by the user, wherein computer program instruction for establishing the communication link comprise computer program instructions for establishing the communication link through a Bluetooth protocol; and computer program instructions for performing one or more data retrieval operations, the computer program instructions for performing each data retrieval operation comprising:

computer program instructions for retrieving data from the wireless device, computer program instructions for populating one or more fields in a web-page with the retrieved data, and computer program instructions for providing the user of the wireless device with a capability to configure the data processing system to require confirmation for each data retrieval, wherein each data retrieval operation corresponds to a different web page.

6. The data processing system of claim 5 wherein computer program instructions for establishing the communication link comprise computer program instructions for establishing the communication link through a USB connection.

7. The computer-implemented method of claim 1, further comprising:

providing the user with a capability to configure the data processing system to require that the user input the password for authentication prior to performing the one or more data retrieval operations corresponding to a first set of one or more web pages, and to perform the one or more data retrieval operations corresponding to a second set of one or more web pages without requiring that the user input the password for authentication.

8. The computer program product of claim 3, the computer readable medium further comprising:

computer program instructions for providing the user with a capability to configure the data processing system to require that the user input the password for authentication prior to performing the one or more data retrieval operations corresponding to a first set of one or more web pages, and to perform the one or more data retrieval operations corresponding to a second set of one or more web pages without requiring that the user input the password for authentication.

9. The data processing system of claim 5, the memory having further disposed therein:

computer program instructions for providing the user with a capability to configure the data processing system to require that the user input the password for authentication prior to performing the one or more data retrieval operations corresponding to a first set of one or more web pages, and to perform the one or more data retrieval operations corresponding to a second set of one or more web pages without requiring that the user input the password for authentication.

* * * * *